United States Patent
Pudipeddi et al.

(10) Patent No.: US 7,133,977 B2
(45) Date of Patent: Nov. 7, 2006

(54) SCALABLE RUNDOWN PROTECTION FOR OBJECT LIFETIME MANAGEMENT

(75) Inventors: Ravisankar Pudipeddi, Sammamish, WA (US); Neill Clift, Kirkland, WA (US); Neal R. Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 10/461,755

(22) Filed: Jun. 13, 2003

(65) Prior Publication Data
US 2004/0255087 A1   Dec. 16, 2004

(51) Int. Cl.
*G06F 12/16* (2006.01)
(52) U.S. Cl. .................. 711/152; 711/145; 711/156; 713/375
(58) Field of Classification Search ............. 711/144, 711/145, 147, 148, 152, 156; 709/248; 713/375
See application file for complete search history.

(56) References Cited

U.S. PATENT DOCUMENTS

| | | | | |
|---|---|---|---|---|
| 5,241,664 A | * | 8/1993 | Ohba et al. ............. | 711/121 |
| 5,802,582 A | * | 9/1998 | Ekanadham et al. ..... | 711/152 |
| 6,266,745 B1 | * | 7/2001 | de Backer et al. ...... | 711/147 |
| 6,513,100 B1 | | 1/2003 | Clift | |
| 6,795,901 B1 | * | 9/2004 | Florek et al. ........... | 711/152 |
| 2003/0130999 A1 | | 7/2003 | Probert, Jr. et al. | |
| 2004/0143712 A1 | * | 7/2004 | Armstrong et al. ...... | 711/152 |

OTHER PUBLICATIONS

Kevin Dowd et al., "High Performance Computing, Second Edition" Jul. 1998—Chapters 10 and 12.

* cited by examiner

*Primary Examiner*—Woo H. Choi
(74) *Attorney, Agent, or Firm*—Merchant & Gould

(57) ABSTRACT

A system and method for object rundown protection that scales with the number of processors in a shared-memory computer system is disclosed. In an embodiment of the present invention, prior to object rundown, a cache-aware reference count data structure is used to prevent cache-pinging that would otherwise result from data sharing across processors in a multiprocessor computer system. In this data structure, a counter of positive references and negative dereferences, aligned on a particular cache line, is maintained for each processor. When an object is to be destroyed, a rundown wait process is begun, during which new references on the object are prohibited, and the total number of outstanding references is added to an on-stack global counter. Destruction is delayed until the global reference count is reduced to zero. In an embodiment of the invention suited to implementation on non-uniform memory access multiprocessor machines, each processor's reference count is additionally allocated in a region of main memory that is physically close to that processor.

19 Claims, 7 Drawing Sheets

SCALABLE RUNDOWN PROTECTION FOR OBJECT LIFETIME MANAGEMENT

TECHNICAL FIELD

The present invention relates generally to computer systems, and more particularly to the management and control of access to and deletion of objects in shared-memory multiprocessor computer machines.

BACKGROUND OF THE INVENTION

The desire to improve computer system performance has driven innovation in both computer architecture and operating systems design. In many contexts, an important goal is to maximize throughput (the number of tasks processed in a given unit of time). One persistent obstacle has been the so-called Von Neumann bottleneck, the gap between faster processors and slower memory. Two general architectural approaches to minimizing this gap and increasing throughput are the use of a multilevel memory hierarchy and the use of multiple processors. In a memory hierarchy, faster, smaller memories are placed closer to the processor, and efforts are made to keep recently-accessed items in the fastest memories. The fastest level of memory, apart from the processor's registers, is the cache, which can itself have one or more levels, and which is organized into cache lines of a fixed size. A cache hit occurs when the processor finds a requested data item in the cache. If the data is not found in the cache, a cache miss occurs, and a line-size block of data that includes the requested item is retrieved from the main memory and placed in a particular cache line.

Most modern multiprocessor machines belong to one of two groups, distinguished by how their memory is organized. The first group includes machines with a relatively small number of processors sharing a single centralized main memory connected to the processors by a bus. These machines are called UMAs (uniform memory access multiprocessors) because the time to access any main memory location is uniform for each processor. The second group comprises machines in which memory is physically distributed among the processors, allowing larger numbers of processors to be supported. Those machines in this group that feature a logically-shared main memory address space are known as NUMAs (non-uniform memory access multiprocessors). In NUMA machines, a processor's access time for a particular data word in main memory depends on the location of that word.

Modern operating systems maximize processor utilization and minimize memory latency through their support for multiprogramming, the ability of several concurrently-executing programs, referred to as processes or threads, to share computer resources. When a first process is being executed by a processor, and the operating system then permits a second process to execute, the operating system performs a context switch. A context switch involves saving the current state of the first process so that its execution can continue at a later time, and restoring the previous state of the program that is about to return to execution.

In systems supporting multiprogramming, there is potentially a high degree of interaction among concurrent processes. The effective coordination of multiple processes is a central problem in operating systems design. It is typical for several processes to require access to some object residing in shared memory, which may itself include methods or data made available by another process. At some point, it may be necessary for such objects to be "run down" (destroyed). For example, the shared object might be a loaded antivirus driver, which typically has a long lifetime (that is, it will be kept loaded while the operating system is running). Periodically, however, it will be necessary for the driver to be unloaded so that an updated version of the driver can be loaded in its place. In such situations, there is a danger that a process might attempt to access an object that has already been deleted or made unavailable, leading to erroneous and unpredictable program and system behavior. It is important, therefore, to guard against the premature destruction or removal of a shared object while references to the object are outstanding.

Solutions to this problem have generally made use of synchronization mechanisms provided by the operating system or the hardware. One conventional approach is to protect the object by placing it under a mutually exclusive lock that can only be acquired by one process at a time. If a second process requires access to the object, it must wait until the lock is released by the first process. This is undesirable for a number of reasons. The time spent on acquisitions and releases of locks may exceed the time needed for access to the object itself, causing a performance bottleneck. Moreover, the use of such locks may lead to deadlocked processes vying for access to the same object. Efforts to minimize the occurrence of deadlocks typically require the diversion of substantial computing resources. Locks also involve the consumption of considerable memory space.

A more finely-grained solution, called rundown protection, has been implemented in Microsoft Corporation's "WINDOWS XP" operating system. Under this approach, a global reference count associated with a particular object is used to ensure that destruction or removal of the object will be delayed until all of the accesses that have already been granted to the object have completed and been released. Access serialization is achieved using atomic interlocked hardware instructions rather than mutually exclusive software locks. Rundown protection is optimized for rapid and lightweight accesses and releases of object references. This is sensible, because typically protection is desired in situations involving a long-lived object which is referenced and dereferenced many times throughout its lifetime. In the loaded antivirus driver example, the references are I/O requests, with the dereferences occurring when the I/O is completed, and rundown protection may be invoked by a kernel component, such as a file system filter manager, to guard against premature unloading of the driver.

Despite the advantages of rundown protection over previous solutions, its routines for acquiring and releasing references have been discovered to cause significantly degraded performance on multiprocessor machines when used by I/O-coordinating file system filter managers to manage the unloading of file system filter drivers, the subject of a copending commonly-assigned U.S. patent application filed today, bearing U.S. Ser. No. 10/461,078. Interlocked increments and decrements were found to cause cache pinging: following a reference count increment or decrement, corresponding cache lines on all the processors would update their caches with the new value, flushing and refreshing the cache in accordance with the machine's coherence protocols. The degradation worsens as more processors are included in the system. It would be desirable, therefore, to provide an improved form of rundown protection that would scale with the number of processors in a multiprocessor computer system.

SUMMARY OF THE INVENTION

The invention provides a system and method for rundown protection on shared-memory multiprocessors that scales with the number of processors in the system while preserving the advantages of rundown protection over other approaches to guarding against premature destruction of shared objects. Separate reference counts are associated with each processor. The reference counts are stored in data structures designed to ensure that each per-processor reference count will be cached in a different cache line, eliminating the cache pinging problem associated with references and dereferences. In an embodiment of the invention intended to be used on NUMA machines, the per-processor reference counts are additionally or alternatively stored in regions of main memory that are physically proximate to their corresponding processors. A global reference count is used instead of per-processor counts when an object is finally to be run down.

BRIEF DESCRIPTION OF THE DRAWINGS

While the appended claims set forth the features of the invention with particularity, the invention and its advantages are best understood by referring to the following detailed description taken in conjunction with the accompanying drawings, of which:

DETAILED DESCRIPTION OF THE INVENTION

The present invention is directed to a system and method for protecting an object residing in shared main memory from being destroyed or rendered inaccessible while outstanding references on the object exist.

Prior to proceeding with a description of the invention, a description of representative computer systems in which the various embodiments of the invention may be practiced is provided. The invention will be described in the general context of computer-executable instructions, such as programs, being executed within a computer device. Generally, programs include routines, methods, procedures, functions, objects, data structures and the like that perform particular tasks or implement particular data types. The term "computer", "computer device" or "machine" as used herein includes any device that electronically executes one or more programs.

Aspects of the invention described herein may be implemented on various kinds of computers, including uniprocessor computers, but the invention is especially intended for multiprocessor computers containing more than one processing unit sharing a main memory. In the description that follows, the invention will be described with reference to acts and symbolic representations of operations performed or executed by a computer. It is understood that these acts and operations include the manipulation by one or more processing units of electrical signals representing data in a structured form. This manipulation transforms the data or maintains it at locations in the memory system of the computer, which reconfigures or otherwise alters the operation of the computer in a manner well-understood by those skilled in the art. The data structures in which data is maintained are physical locations of the memory that have particular properties defined by the format of the data.

Each processing unit in a computer is capable of executing a set of machine language instructions in accordance with embodiments of the invention. A computer program executed by a processing unit incorporates one or more sequences of the set of machine language instructions recognized by that processing unit. A program, in the form of machine language object code, typically lies quiescent in storage until needed. When needed, the object code is incorporated into an active process, for example by being loaded into memory or using a virtual memory technique. A processing unit can then execute each machine language instruction in an active process. The machine language instructions can be executed in sequence unless program execution is redirected by an execution branch instruction, terminated by a process termination instruction, or the last instruction in the sequence is executed.

Figure 1:
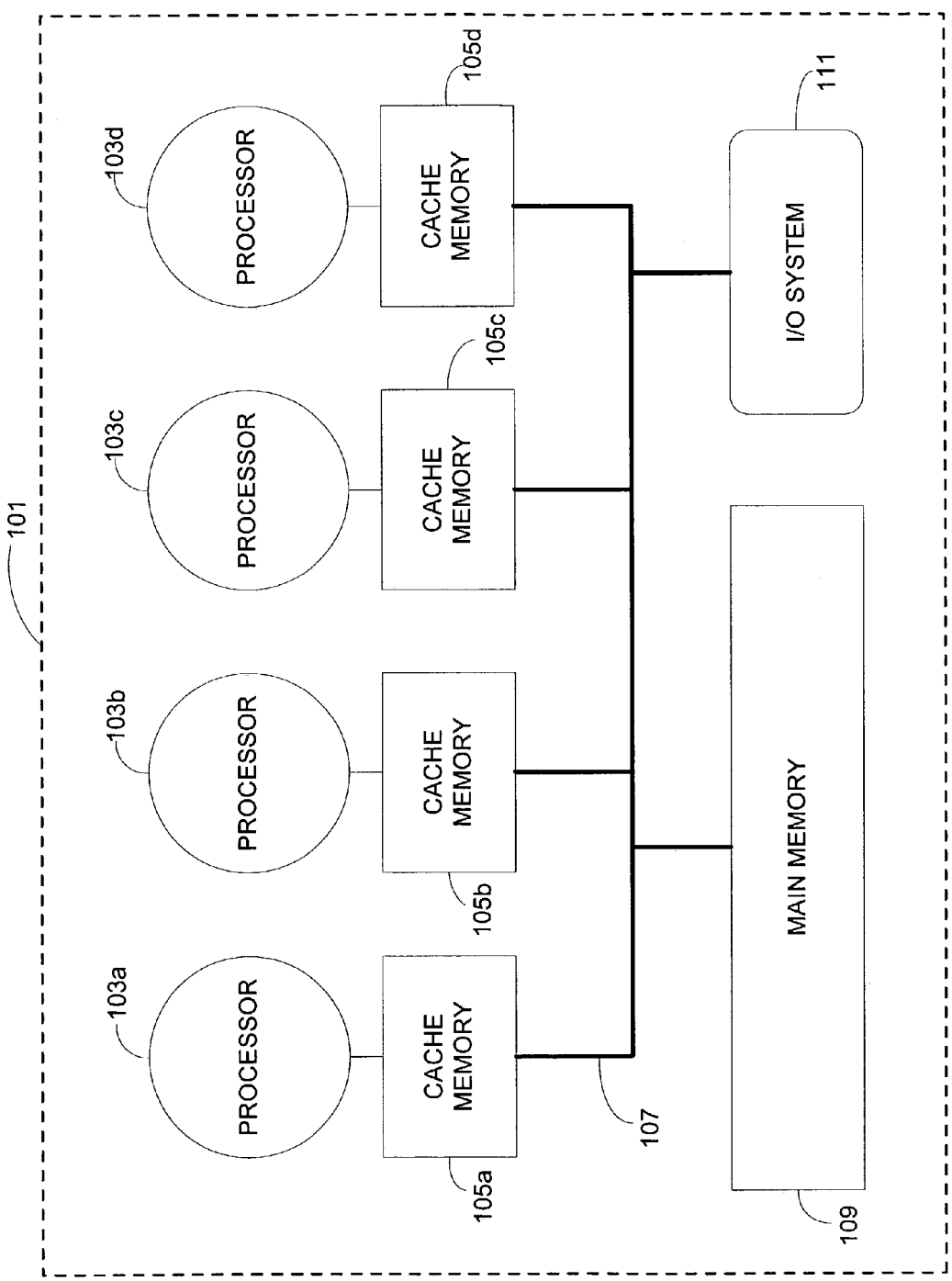
FIG. 1 is a schematic diagram generally illustrating an exemplary centralized shared-memory UMA multiprocessor computer system on which an embodiment of the invention can be implemented.

Referring to FIG. 1, a simplified illustration of an exemplary uniform memory access (UMA) multiprocessor machine 101, on which aspects of an embodiment of the present invention may be implemented, is shown. The depicted UMA machine 101 has four processors or central processing units (CPUs) 103a, 103b, 103c, 103d. Each of the processors 103a, 103b, 103c, 103d has an associated local cache memory 105a, 105b, 105c, 105d, each of which contains one or more levels. Each processor and cache pair 103a and 105a, 103b and 105b, 103c and 105c, 103d and, 105d shares the same physically centralized main memory 109 and is typically connected to the main memory 109 by a bus 107. The single main memory 109 has a uniform access time from each processor 103a, 103b, 103c, 103d. The use in FIG. 1 of four processors 103a, 103b, 103c, 103d is for purposes of illustrative simplicity only, and it should be understood that an UMA machine 101 in accordance with the invention may contain more or fewer processors. Other parts of the machine 101 will typically include an I/O system 111 containing input/output devices and media.

Figure 2:
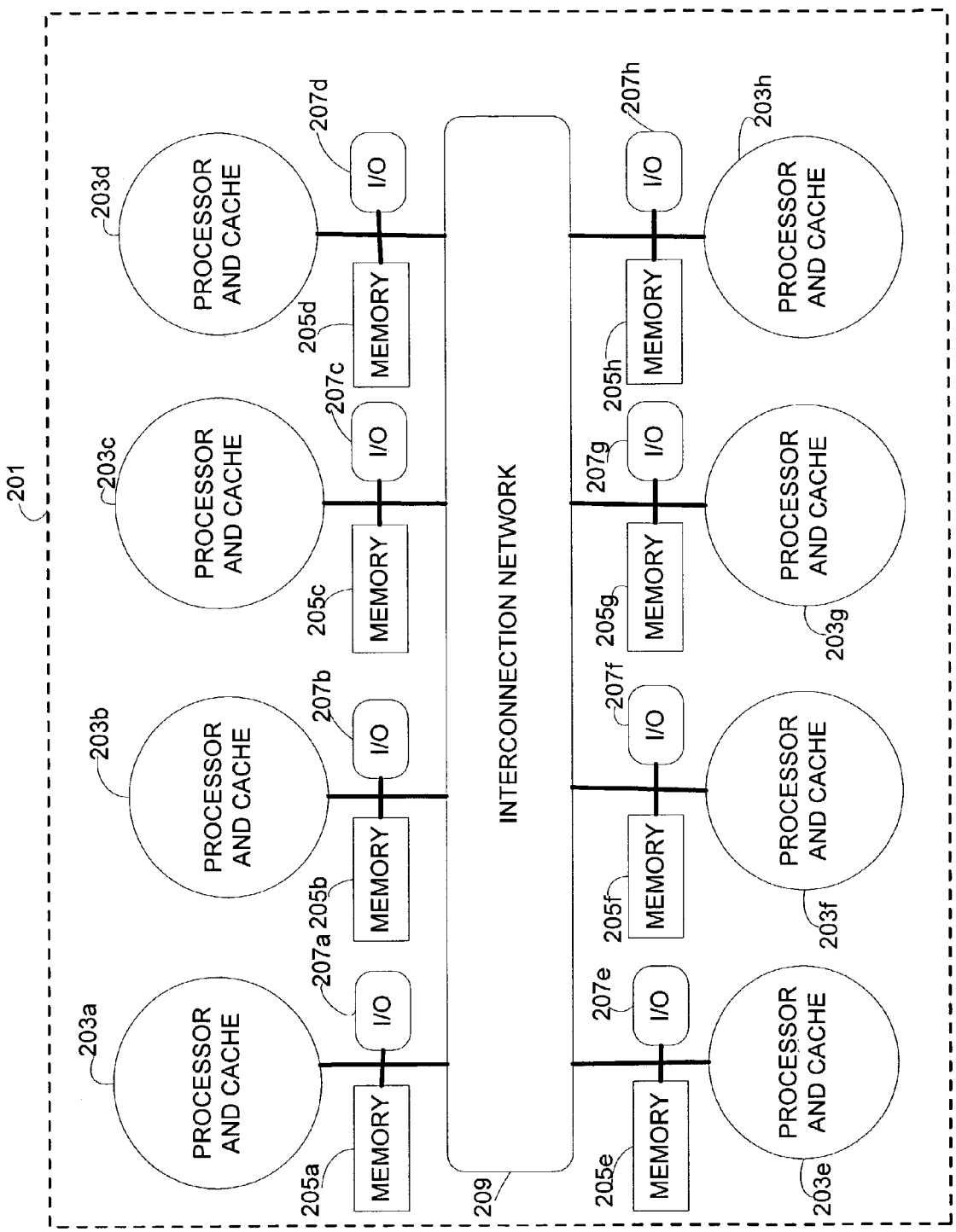
FIG. 2 is a schematic diagram generally illustrating an exemplary NUMA multiprocessor computer system on which an embodiment of the invention can be implemented.

Referring now to FIG. 2, a simplified illustration of an exemplary non-uniform memory access (NUMA) multiprocessor machine 201, on which aspects of an embodiment of the present invention may be implemented, is shown. The depicted NUMA machine 201 has eight nodes 203a, 203b, 203c, 203d, 203e, 203f, 203g, 203h. The use in FIG. 2 of eight nodes 203a, 203b, 203c, 203d, 203e, 203f, 203g, 203h is for purposes of illustrative simplicity only, and it should be understood that a NUMA machine 201 in accordance with the invention may contain more or fewer nodes. Each node 203a, 203b, 203c, 203d, 203e, 203f, 203g, 203h as depicted contains a processor with a local cache. However, it should be understood that a node of a NUMA machine may contain one or more locally-connected processors, each with its own cache. Each node further contains some memory 205a, 205b, 205c, 205d, 205e, 205f, 205g, 205h, together forming a physically-distributed main memory shared as one logical address space by the processor nodes 203a, 203b, 203c, 203d, 203e, 203f, 203g, 203h in the NUMA machine 201. Typically each node contains I/O devices 207a, 207b, 207c, 207d, 207e, 207f, 207g, 207h. The nodes 203a, 203b, 203c, 203d, 203e, 203f, 203g, 203h are connected to one another by a global interconnection network 209. The access time from a processor in one of the nodes 203a, 203b, 203c, 203d, 203e, 203f, 203g, 203h to the distributed shared main memory will vary depending on the physical location of the desired data word in memory.

The present invention achieves for multiprocessor systems, without sacrificing scalability, the objective of rundown protection: protecting objects from being prematurely removed or destroyed. Access to a protected object requires the taking of a rundown reference on that object. When the protected object must be deleted, a rundown wait routine is invoked. The rundown wait ensures that no additional references may be taken on the object, and it guarantees that the object will not be deleted while there are still outstanding references on it which have not yet completed.

Figure 3:
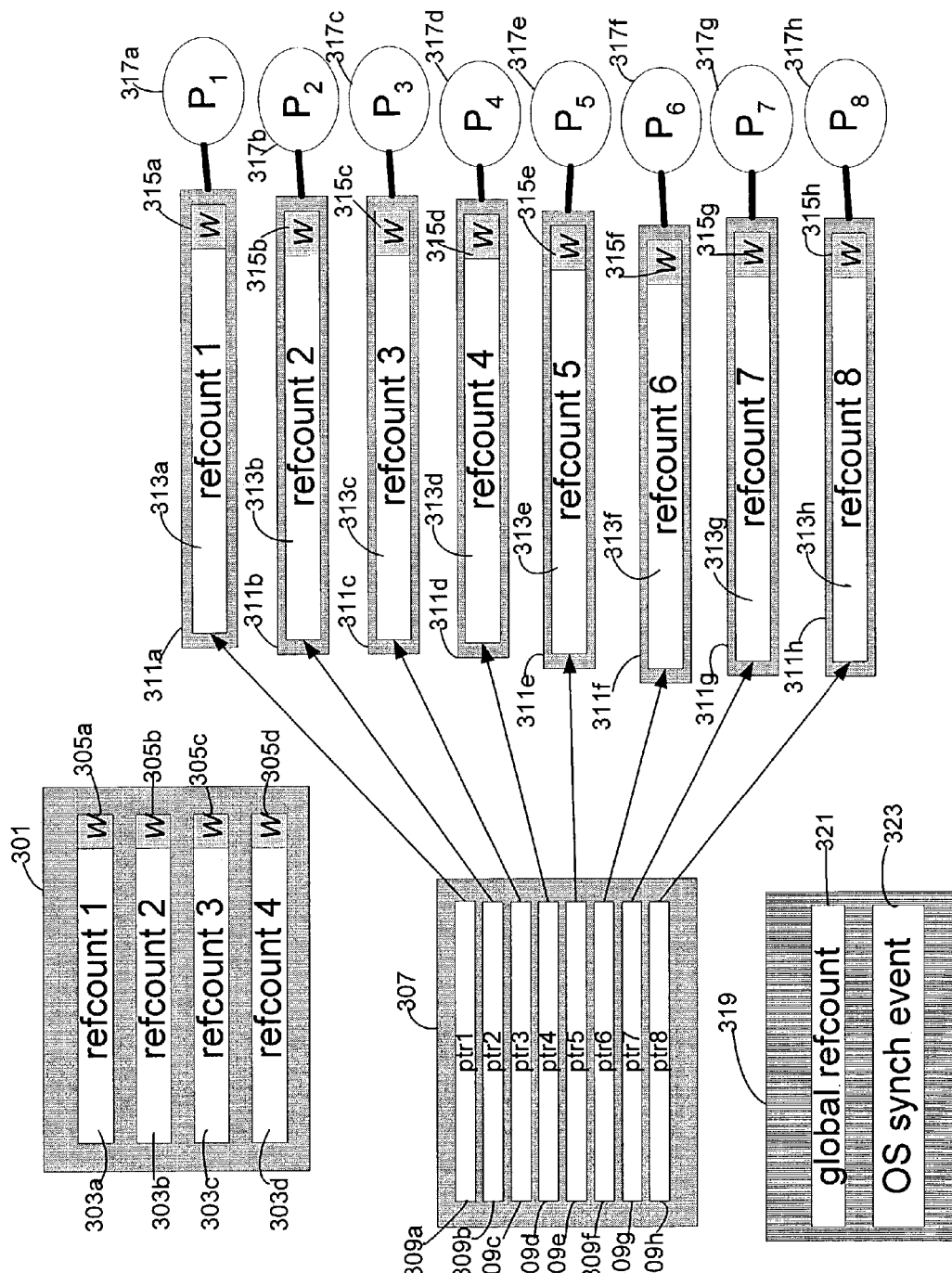
FIG. 3 is a diagram illustrating data structures stored in memory which are used by UMA and NUMA embodiments of the invention.

To eliminate the problem of contention on corresponding cache lines, a cache-aware rundown reference data structure is used. Instead of a global reference count, a separate reference count is maintained for each processor in the system, aligned in such a way that each reference count will be cached in a distinct cache line, without overlap. Turning to FIG. 3, a representation of a rundown reference data structure 301 for a four-processor UMA machine like the machine 101 depicted in FIG. 1 is shown. Each of the four processors has an associated per-processor reference count 303a, 303b, 303c, 303d within the rundown reference data structure 301.

Each per-processor reference count 303a, 303b, 303c, 303d is itself contained in a data structure that includes a field to hold the actual count, along with padding to ensure that the reference count structure is the size of a cache line block. In an embodiment of the invention, for reasons that will become clear in the discussion below, each per-processor count is stored in an integer data field that is large enough to hold a main memory address pointer. It will therefore be the size of the basic addressing width of the processors in the machine. On a 32-bit x86 machine, for example, a 32-bit data type would be used; similarly, on a 64-bit machine, a 64-bit data type would be used. The least significant bit of the count data field is depicted in the data structure 301 as a shaded square 305a, 305b, 305c, 305d at the right end of each per-processor reference count 303a, 303b, 303c, 303d. This bit, which will be referred to as the "w-bit", is used to indicate whether a rundown wait is in progress, with 0 indicating that rundown wait has not yet begun and 1 indicating that a rundown wait is active. In order to preserve the value of the w-bit, the per-processor count is incremented in twos.

It is important to recognize that a reference on an object may be acquired by one processor in the system but may be released by a different processor (as a result of context switches and processor scheduling by the operating system, for example). A release of a reference executed by a processor is marked by a decrementing of that processor's reference count. For this reason, each per-processor count may be negative as well as positive or zero. Since the least significant bit of the count is reserved for use as the w-bit, and since a bit must be used as a sign bit because the count can go below zero, the effective number of outstanding references possible at any given time on an N-bit machine is $2^{N-2}$. This is not a significant limitation in practice, since even on a 32-bit machine this will be a very large number ($2^{30}$ is greater than one billion). It is reasonable to assume that having one billion operations outstanding on a given object at any instant is extremely unlikely. It can therefore be assumed that at any given moment of time, the sum of all the per-processor counts represents the number of outstanding references on the object, and that if the sum of the counts equals zero then all references have completed.

On an UMA machine, the set of per-processor reference counts 303a, 303b, 303c, 303d will typically be stored as the elements of an array. The entire rundown reference data structure 301 will include the array or a pointer to the array, and padding to ensure that the beginning of the array is aligned on a cache-line boundary, so that each per-processor reference count data structure is cache-line-aligned. The rundown reference data structure may include additional fields, such as a count of the total number of processors in the system.

An array of cache-aligned per-processor reference count structures is suitable for an UMA machine, but is not suitable for a NUMA machine such as the eight-node, one-processor-per-node machine 201 illustrated in FIG. 2. A rundown reference data structure 307 appropriate for such a machine is depicted in FIG. 3. The per-processor count data structures 313a, 313b, 313c, 313d, 313e, 313f, 313g, 313h have the same form as those in the UMA example 301, including the use of the least significant bit 315a, 315b, 315c, 315d, 315e, 315f, 315g, 315h as a w-bit. To achieve good performance, however, each per-processor count structure 313a, 313b, 313c, 313d, 313e, 313f, 313g, 313h is stored in an area of the physically-distributed shared main memory 311a, 311b, 311c, 311d, 311e, 311f, 311g, 311h to which the corresponding processor 317a, 317b, 317c, 317d, 317e, 317f, 317g, 317h has fast access, which will generally be in a unit of the shared main memory that is physically close to that processor's node. Therefore, the global rundown reference data structure 307 will contain or point to an array of pointers, with each pointer 309a, 309b, 309c, 309d, 309e, 309f, 309g, 309h holding the address of a per-processor reference count structure 313a, 313b, 313c, 313d, 313e, 313f, 313g, 313h.

Figure 4:
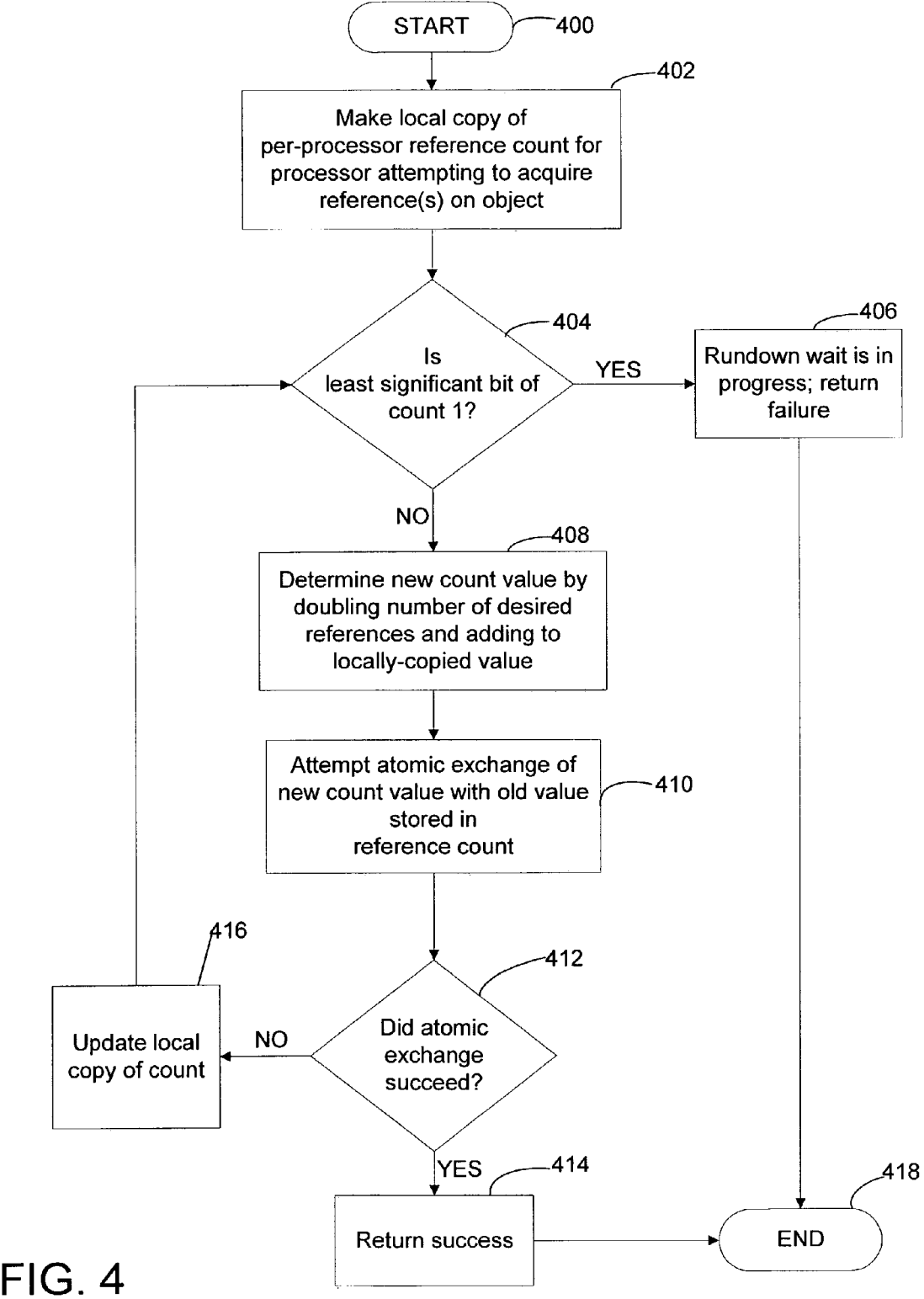
FIG. 4 is a flowchart depicting the steps of a procedure for granting a rundown reference in accordance with an embodiment of the invention.

The flowchart of FIG. 4 depicts the steps of an algorithm for obtaining a rundown reference on a protected object in accordance with the invention. At step 400, a process desiring one or more references on the object invokes the primitive. In a typical embodiment this will essentially take the form of a function call passing, as parameters, the per-processor reference count structure corresponding to the current processor (the processor executing the request for a reference on the object) along with the number of references being requested. At step 402 a local copy of the processor's reference count value is made. The w-bit of the copied value is examined in step 404. If the w-bit is 1, a rundown wait is already in progress, so no references on the object will be granted. The function therefore returns to the caller in step 406 with an indication that the request has failed, and the algorithm is ended at step 418. If the w-bit is 0, the algorithm proceeds to step 408, where an updated reference count value for the processor is determined by doubling the desired number of new references (which can typically be done simply by a single left shift of that number) and adding the result to the locally-copied old value. The result is stored in a separate local copy.

In step 410 an attempt is made to atomically exchange the locally-stored new reference count value for the old value stored in the per-processor count by invoking an interlocked hardware synchronization primitive, so that the exchange will not succeed if the per-processor count value has changed since the local copy was made. In step 412, the result of using the primitive is examined to determine whether the atomic exchange succeeded. If it was successful, the algorithm returns in step 414 with an indication that the requested rundown references are obtained, and the algorithm ends in step 418. If the atomic exchange failed, the local copy of the reference count is updated to the current value in step 416, and the algorithm branches back to the test of the w-bit in step 404, since it is possible that a rundown wait has begun in the meantime.

Figure 5:
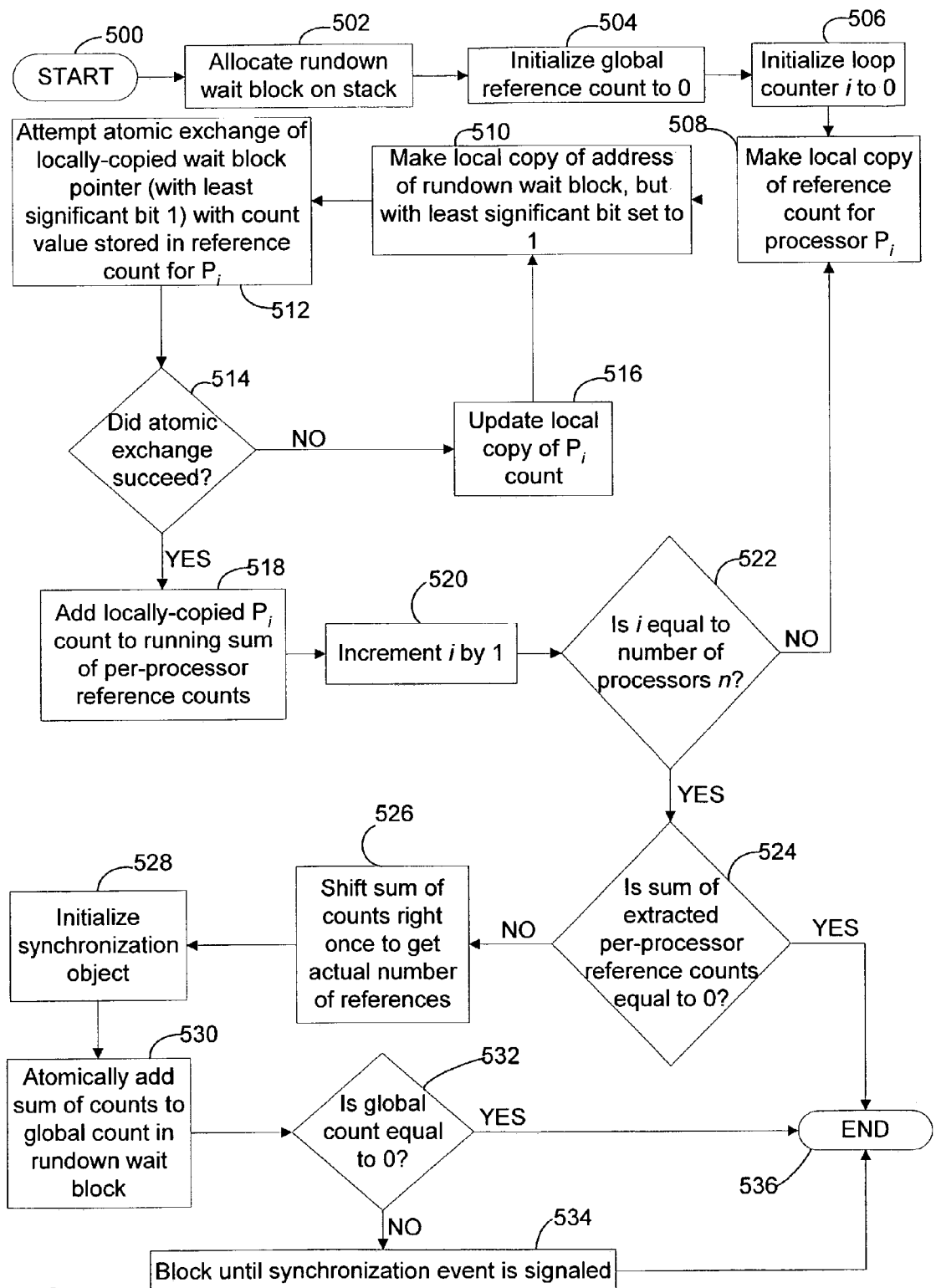
FIG. 5 is a flowchart depicting the steps of a procedure for a rundown wait in accordance with an embodiment of the invention.

The rundown dereferencing primitive can best be understood following an explanation of the rundown wait routine. Referring therefore to FIG. 5, the flowchart therein presents an embodiment of the rundown wait routine in accordance with the invention. Rundown wait is initiated, at step 500, by a process seeking to destroy the rundown-protected object. The rundown wait routine makes use of a single global reference count rather than the set of cache-line-aligned per-processor counts. Although the use of the global count may lead to cache-pinging, the resulting performance degradation is dwarfed by the high cost of destruction of the object itself following the rundown wait. Destruction of an object occurs only once in the object's lifetime, and some inefficiency at the very end of that lifetime is a tolerable tradeoff. By contrast, referencing and dereferencing of objects may occur numerous times throughout the object's lifetime, and so in the aggregate memory latencies associated with referencing and dereferencing become a very significant factor in performance.

In step 502, the new global rundown wait block data structure is allocated. Turning to FIG. 3, an illustration of a rundown wait block 319 in an embodiment of the invention is given. The data structure includes two fields, the global reference count 321 and a synchronization primitive 323 supplied by the operating system which will allow the rundown wait process to block indefinitely until it is signaled to wake up. Turning again to FIG. 5, in step 502 the rundown wait block is allocated on a runtime stack as part of the activation record for the rundown wait procedure. An on-stack allocation can be used because memory allocation failures are not of concern at this point. The rundown wait block requires very little memory; the synchronization primitive is generally implemented in operating systems to consume as little space as possible. In step 504, the global reference count field of the rundown wait block is initialized to 0.

Step 506 marks the beginning of a loop over all the processors. The loop will mark each per-processor count, by setting the w-bit, to indicate to rundown reference acquire and release primitives that rundown is active, and it will extract each per-processor count so that they may be summed. The loop will also switch the non-w-bit portion of the per-processor count with a pointer to the on-stack rundown wait block. This is why the data type of the reference counts must be wide enough to hold a basic address. A local copy of the reference count of the processor currently being iterated over is saved in step 508. The address of the on-stack rundown wait block is locally stored in step 510, with the least significant bit set to 1. Then, in step 512, an attempt is made to atomically exchange the resulting value for the current processor's reference count value, using an interlocked synchronization primitive as in the algorithm for obtaining rundown references. In step 514, it is determined whether the atomic exchange was successful. If it failed, the local copy of the per-processor reference count is updated to the current value in step 516, and the algorithm branches back to step 510 to attempt an atomic exchange again. If the atomic exchange succeeded, the local copy of the per-processor reference count is added to a running total of all reference counts in step 518. Note that at this point no further references requested by this processor will succeed, because the w-bit has been set to 1. In addition, the per-processor count contains a pointer to the on-stack rundown wait block, apart from the set least significant bit. The loop counter is incremented in step 520, and the counter is tested in step 522. When the loop has completed iterating over all the processors, the algorithm proceeds to step 524.

The total of all atomically extracted per-processor reference counts must be no less than zero, because there cannot have been a greater number of dereferences than references. The most significant bit of the reference count tally (the sign bit) must therefore be zero. Step 524 determines whether the per-processor reference count total is zero. If so, there are no outstanding references, so the algorithm terminates immediately in step 536 without having to block. Otherwise, in step 526 the reference count total is shifted right once, halving the total, in order to obtain the actual number of references, since references have been incremented and decremented in twos. Step 528 initializes the synchronization object which, in an embodiment of the invention, is a field of the on-stack rundown wait block. In step 530 the sum of outstanding references is atomically added to the on-stack global count. Step 532 then determines whether the global count is now equal to zero. While the global count can never be incremented, it is possible that rundown releases have already been pointed to the global count and have decremented it below zero. If the result of adding the tallied reference counts to the global count is now zero, because dereferences for all the outstanding accesses have already come in, the algorithm simply terminates in step 536. Otherwise, it blocks on the synchronization event in step 534 until it is signaled that the global reference count has dropped to zero, at which point it ends the rundown wait in step 536.

Figure 6:
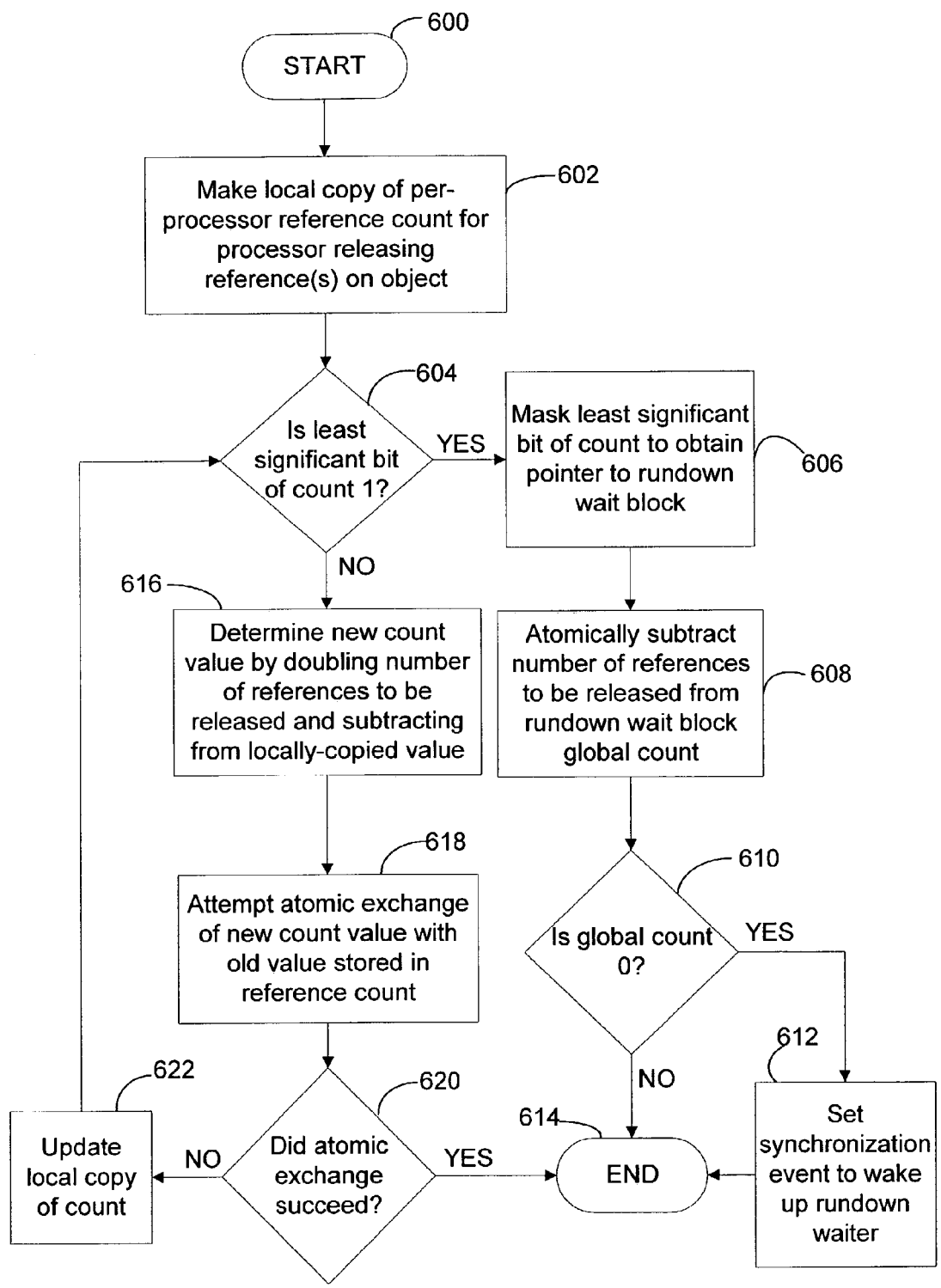
FIG. 6 is a flowchart depicting the steps of a procedure for releasing a rundown reference in accordance with an embodiment of the invention.

The flowchart of FIG. 6 depicts the steps of a third algorithm used in accordance with the invention, invoked at step 600 as a primitive by a process seeking to release (dereference) one or more references on the protected object. In a typical embodiment this will essentially take the form of a function call passing, as parameters, the per-processor structure corresponding to the current processor (the processor executing the request to release the reference) along with the number of references being released. At step 602 a local copy of the processor's reference count value is made. The w-bit of the copied value is examined in step 604. If the w-bit is 1, a rundown wait is in progress. The dereferencer will therefore be redirected to the on-stack rundown wait block. The w-bit is masked in step 606 to obtain the address of the block. In step 608, the number of references being released is atomically subtracted from the global count in the rundown wait block. At step 610 the value of the global count is examined. If the global count is now zero, the invoker of the algorithm is the final dereferencer and there are no additional outstanding references. Therefore, at step 612 the rundown waiter is awakened to complete the rundown wait, and the algorithm terminates in step 614. If the global count is not zero, the rundown waiter cannot yet be awakened from blocking, so the algorithm simply terminates at step 614.

If it is determined at step 604 that the w-bit is 0, a rundown wait has not yet been initiated. A procedure similar to the one used in acquiring rundown references is then used to release the references. In step 616 an updated reference count value for the processor is determined by doubling the desired number of new references and adding the result to the locally-copied old value. The result is stored in a separate local copy. In step 618 an attempt is made to atomically exchange the locally-stored decremented reference count value for the old value stored in the per-processor count. In step 620, the result of using the primitive is examined to determine whether the atomic exchange succeeded. If it was successful, the algorithm terminates at step 614, with the references successfully released. If the atomic exchange failed, the local copy of the reference count is updated to the current value in step 622, and the algorithm branches back to the test of the w-bit in step 604, since it is possible that a rundown wait has begun in the meantime.

Figure 7:
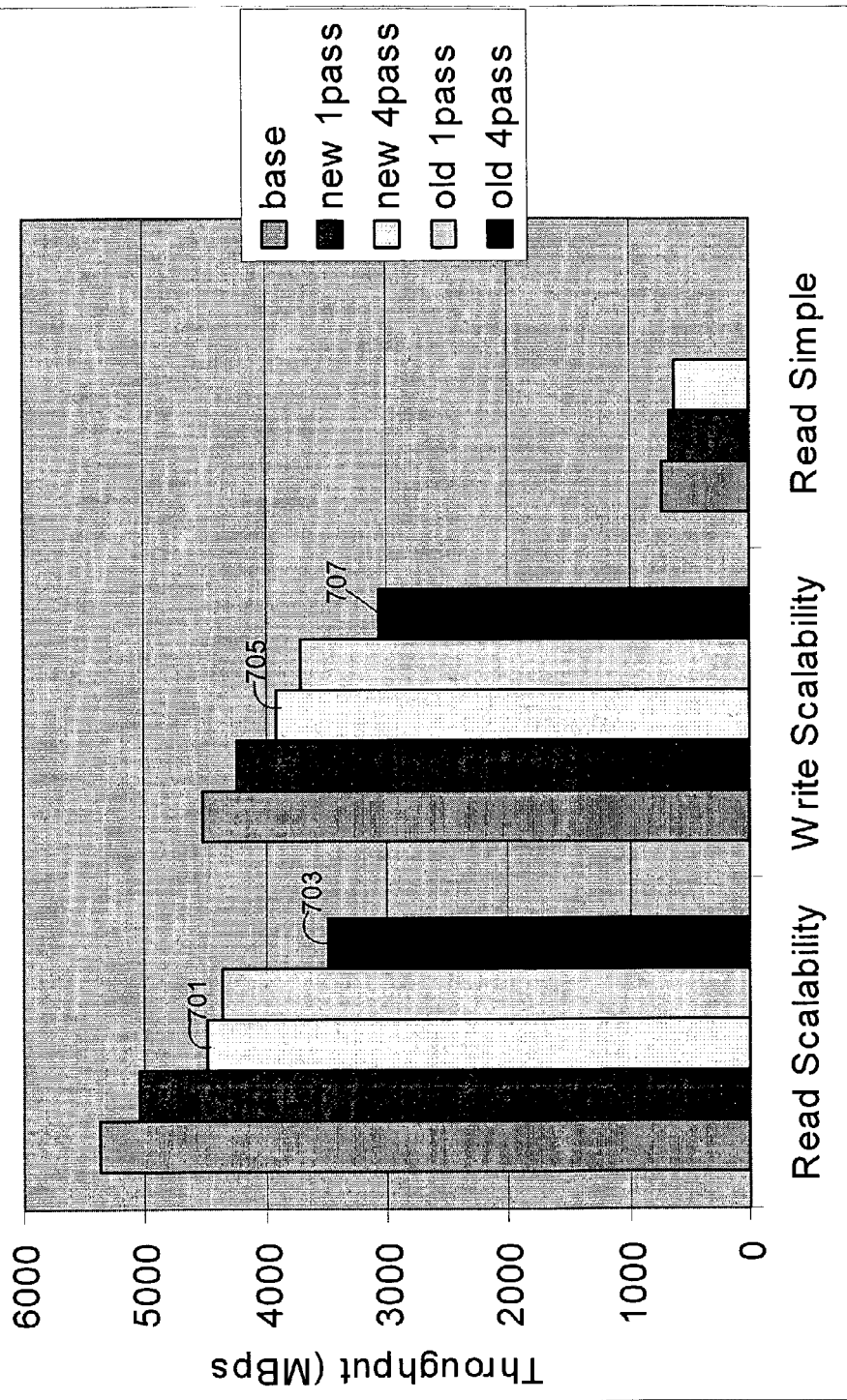
FIG. 7 is a bar graph illustrating the measurement of improvements in scalability achieved following the use of an implementation of an embodiment of the invention with a file system filter manager.

Referring now to FIG. 7, the results of tests measuring the scalability-related performance improvement from the use of the invention in one application context are shown as a bar graph. Rundown protection primitives in accordance with the invention have been incorporated into the implementation of routines for unloading file system filter drivers by a file system filter manager. I/O-intensive tests of the file system filter manager running on an eight-processor Intel x86 UMA system showed a reduction in performance degradation from as high as 35 percent 703, 707 to 16.6 percent 701 for read throughput and 13.6 percent 707 for write throughput, with four pass-through filters. The reduction is attributable entirely to the enhancement brought about by the invention's elimination of cache line contention.

The terms "a", "an", "the" and similar referents used in the context of describing the invention, especially in the context of the following claims, are to be construed to cover both the singular and plural, unless otherwise indicated herein or clearly contradicted by context. The terms "comprising", "having", "including", and "containing" are to be construed as open-ended terms, unless otherwise noted. All methods described herein can be performed in any suitable order unless otherwise indicated herein or otherwise clearly contradicted by context. The use of any and all examples, or exemplary language provided herein is intended merely to better illuminate the invention and does not pose a limitation on the scope of the invention unless otherwise claimed. No language in the specification should be construed as indicating that any non-claimed element is essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of preventing an object from being destroyed or otherwise rendered inaccessible in a multiprocessor environment with a shared memory while at least one reference on the object exists, the method comprising:
    maintaining a local reference count for each of the plurality of processors;
    managing requests for new references on the object and releases of existing references on the object based on the local reference counts and a global reference counts, wherein managing requests for new references comprises:
        if a rundown wait is in progress, refusing to grant a new reference; and
        if a rundown wait is not in progress, and a processor executes a request for at least one new reference, updating the per-processor count associated with the processor by atomically replacing the per-processor count with a new per-processor count reflecting an addition of the at least one new reference; and
    executing a rundown wait routine that establishes the global reference count when the object is to be destroyed or otherwise rendered inaccessible.

2. The method of claim 1 wherein updating the per-processor count further comprises:
    making a local copy of the per-processor count;
    basing the new per-processor count on the local copy; and
    if an attempt to atomically replace the per-processor count fails, repeating the updating step of claim 1.

3. The method of claim 2 wherein the new count is formed by incrementing the local copy by two for each new reference.

4. The method of claim 1 wherein executing a rundown wait routine comprises:
    allocating a global reference count, initialized to zero;
    for each processor, completing the following five steps:
        a. making a local copy of the associated per-processor count;
        b. making a local copy of the address of the global count;
        c. setting a least significant bit of the local copy of the address to 1;
        d. atomically replacing the per-processor count with the address, including the least significant bit set to 1; and
        e. returning to step a. if an attempt to atomically replace is unsuccessful;
    finding a sum of the local copies of the per-processor counts;
    if the sum equals zero, ending the rundown wait routine;
    otherwise, atomically adding the sum to the global count;
    if the global count now equals zero, ending the rundown wait routine;
    otherwise, blocking until being woken up, and then ending the rundown wait routine.

5. The method of claim 1 wherein managing releases of existing references comprises:
    if a rundown wait is in progress, and a processor executes a request to release at least one reference, atomically decrementing the global reference count by the at least one reference, and, if the global count now equals zero, waking up the rundown wait routine; and
    if a rundown wait is not in progress, and a processor executes a request to release at least one reference, updating the per-processor count associated with the processor by atomically replacing the per-processor count with a new per-processor count reflecting a subtraction of the at least one reference.

6. The method of claim 5 wherein updating the per-processor count further comprises:
   making a local copy of the per-processor count;
   basing the new per-processor count on the local copy; and
   if an attempt to atomically replace the per-processor count fails, repeating the updating step of claim 5.

7. The method of claim 6 wherein the new count is formed by decrementing the local copy by two for each reference for which release is requested.

8. The method of claim 1 wherein each processor has a local cache memory, and wherein the per-processor reference counts are stored as elements of an array, each element being aligned on a cache-line boundary.

9. The method of claim 1 wherein a least significant bit being 0 in a per-processor reference count indicates that a rundown wait is not in progress, and a least significant bit being 1 indicates that a rundown wait is in progress, and wherein the least significant bit of each per-processor count is initialized to 0.

10. The method of claim 1 wherein the computer system is a centralized shared memory multiprocessor system.

11. The method of claim 1 wherein the computer system is a NUMA machine.

12. The method of claim 11 wherein each per-processor reference count is stored in a region of main memory to which the processor associated with the count has fast access.

13. The method of claim 1 wherein the object is a process.

14. The method of claim 1 wherein the object is a thread.

15. The method of claim 1 wherein the object is a loaded driver.

16. The method of claim 1 wherein requests for new references and requests for releases of existing references are made by a file system filter manager.

17. The method of claim 1 wherein the global reference count is allocated on a main memory runtime stack.

18. The method of claim 1 wherein interlocked operations are used to ensure that accesses and modifications of memory are atomic.

19. A computer-readable medium having stored thereon computer-executable instructions for performing the method of claim 1.

* * * * *